United States Patent

(12) United States Patent
Roux

(10) Patent No.: US 6,411,535 B1
(45) Date of Patent: Jun. 25, 2002

(54) POWER FACTOR CORRECTION CIRCUIT WITH INTEGRAL BRIDGE FUNCTION

(75) Inventor: Phillip J. Roux, Sutton, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 09/822,742

(22) Filed: Mar. 29, 2001

(51) Int. Cl.$^7$ .............................. H02M 7/00; H02M 5/42
(52) U.S. Cl. ............................. 363/124; 363/89; 363/44
(58) Field of Search ........................... 363/124, 44, 89, 363/126; 323/222

(56) References Cited

U.S. PATENT DOCUMENTS

| | | | | |
|---|---|---|---|---|
| 4,384,321 A | * | 5/1983 | Rippel | 363/124 |
| 5,946,202 A | * | 8/1999 | Balogh | 363/26 |
| 6,031,739 A | * | 2/2000 | He et al. | 363/44 |
| 6,043,997 A | * | 3/2000 | He et al. | 363/44 |
| 6,191,564 B1 | * | 2/2001 | Mao | 323/222 |
| 6,191,565 B1 | * | 2/2001 | Lee et al. | 323/222 |
| 6,272,027 B1 | * | 8/2001 | Fraidlin et al. | 363/26 |
| 6,282,109 B1 | * | 8/2001 | Fraidlin et al. | 363/89 |

* cited by examiner

*Primary Examiner*—Bao Q. Vu
(74) *Attorney, Agent, or Firm*—Davis & Bujold, P.L.L.C.

(57) ABSTRACT

A power conversion circuit for converting alternating current power to regulated direct current power by a power factor correction circuit having an integral bridge function providing reduced power consumption. A switching power conversion circuit provides direct current power to a load from an alternating current power source by providing current to an energy storage capacitor connected across the load from each of a first switching boost converter circuit and a second switching boost converter circuit operating alternately during corresponding polarity half cycles of the alternating current power source. The first and second switching boost converter circuits each include alternating current inputs connected inversely with respect to each other to first and second terminals of an alternating current power source and current outputs connected in parallel across an energy storage capacitor for storing current from the first and second boost converter circuits and providing direct current power to a load. A gate switching signal is generated to control the switching of the first and second boost converter circuits, and thereby to control the current delivered into the energy storage capacitor and the voltage provided to the load.

5 Claims, 2 Drawing Sheets

Switching Power Conversion Circuit 100

Switching Power Conversion Circuit 100

POWER FACTOR CORRECTION CIRCUIT WITH INTEGRAL BRIDGE FUNCTION

FIELD OF THE INVENTION

The present invention relates to a power conversion circuit for converting alternating current power to regulated direct current power and, in particular, to a power factor correction circuit with an integral bridge function providing reduced power consumption.

BACKGROUND OF THE INVENTION

All electrical and electronic devices and systems require a source of electrical power and, with the exception of devices such as motors that are specifically designed to operate with alternating current power, most devices and systems typically require direct current power at one or more voltage/current levels. In contrast to power requirements of the majority of devices and systems, however, power sources providing alternating current power are typically preferred as being more efficient power generators and as providing higher levels of power and because alternating current power is more easily distributed and more easily converted to different voltage/current levels. Even systems employing direct current power sources, such as batteries, solar cells and fuel cells, therefore typically include direct current to alternating current converters to allow the subsequent generation and distribution of direct current power at various voltage and current levels in the system.

The conversion of alternating current (ac) power from various sources, such as generators, direct current to alternating current (dc-ac) converters, or an electrical power grid, such as the 60 Hz, 117 VAC grid that is standard in the United States or the equivalent power grids of other countries, to direct current (dc) power at various voltage and current levels is therefore a common requirement and problem in a wide range of systems, including computer systems and in the sub-systems of computer systems. A recurring problem with such ac-dc converters, however, is in controlling and minimizing the power losses inherent in such conversions to thereby both deliver more power more efficiently to a system or device using the dc power and to reduce the heat resulting from power losses which must be dissipated or otherwise disposed of. As will be described further in the following description of the invention, this problem is compounded in that a conventional ac-dc converter typically generates regulated dc power from ac power in two stages, each of which results in power losses, the first being the conversion of ac power to unregulated dc power and the second being the regulation of the dc power to provide the desired dc power to a system or device.

The present invention provides a solution to these and other problems of the prior art.

SUMMARY OF THE INVENTION

The present invention is directed to a power conversion circuit for converting alternating current power to regulated direct current power and, in particular, to a power factor correction circuit with an integral bridge function providing reduced power consumption.

According to the present invention, a switching power conversion circuit provides direct current power to a load from an alternating current power source by providing current to an energy storage capacitor connected across the load from each of a first switching boost converter circuit and a second switching boost converter circuit operating alternately during corresponding polarity half cycles of the alternating current power source. The first and second switching boost converter circuits each include alternating current inputs connected inversely with respect to each other to first and second terminals of an alternating current power source and current outputs connected in parallel across an energy storage capacitor for storing current from the first and second boost converter circuits and providing direct current power to a load. A gate switching signal is generated to control the switching of the first and second boost converter circuits, and thereby to control the current delivered into the energy storage capacitor and the voltage provided to the load.

The input terminal of the first boost converter circuit and the input return terminal of the second boost converter circuit are connected together for connection to a first terminal of the alternating current power source, and the input terminal of the second boost converter circuit and the input return terminal of the first boost converter circuit are connected together for connection to a second terminal of the alternating current power source. The output terminals of the first and second boost converter circuits are in turn connected to a first end of the energy storage capacitor and output return terminals of the first and second boost converter circuits are connected to a second end of the energy storage capacitor.

According to the present invention, each boost converter circuit includes a switching device having an input and an output connected to a conductive path through the switching path and a switching control input and an inductor having a first end connected from the input terminal of the boost converter circuit and a second end connected to the input of the switching device conductive path. The input of the switching device conductive path is connected to a first end of the energy storage capacitor while the output of the switching device conductive path is connected to a second end of the energy storage capacitor and to the input return terminal of the boost converter circuit and the switching control input of the switching device is connected to the gate switching signal.

The current return path of the first boost converter includes a diode connected between the output and input of the second switching device conductive path, and the inductor connected between the input of the second switching device conductive path and the input terminal of the second boost converter circuit. The current return path of the second boost converter in turn includes a diode connected between the output and input of the first switching device conductive path, and the inductor connected between the input of the first switching device conductive path and the input terminal of the first boost converter circuit.

DESCRIPTION OF THE DRAWINGS

The foregoing and other objects, features and advantages of the present invention will be apparent from the following description of the invention and embodiments thereof, as illustrated in the accompanying figures, wherein.

DETAILED DESCRIPTION OF THE INVENTION

The following will first describe a switching power conversion circuit of the prior art, and will then describe a switching power conversion circuit of the present invention.

Figure 1:
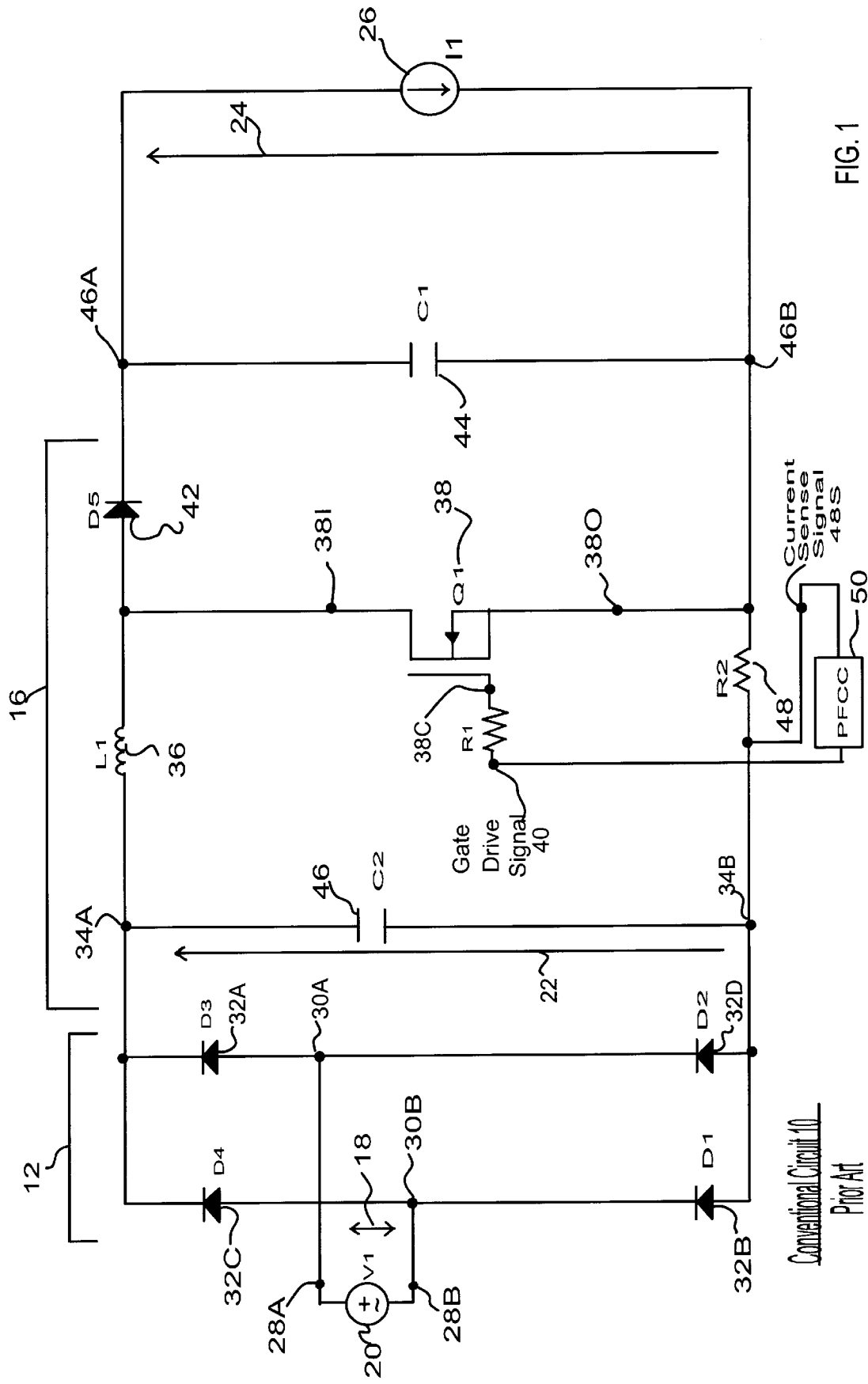
FIG. 1 is a block diagram of a conventional switching power conversion circuit of the prior art.

Referring to FIG. 1, therein is illustrated a typical, Conventional Switching Power Conversion Circuit (Conventional Circuit) 10 of the prior art as may be used, for example, to convert 60 Hz, 117VAC line current to a regulated dc voltage for powering, for example, a computer system of sub-systems of a computer system. As the design and operation of such conventional power conversion circuits of the prior art are well known to those of ordinary skill in the relevant arts, the operation of Conventional Circuit 10 will not be discussed in detail herein. Conventional circuit 10 is illustrated and will be discussed herein, however, as a basis for comparison with a switching power conversion circuit of the present invention and to assist in describing and understanding a switching power conversion circuit of the present invention.

As shown therein, a Conventional Circuit 10 is comprised of an AC Bridge Rectifier 12 and a Boost Converter 16 wherein AC Bridge Rectifier 12 operates to convert AC Voltage 18 provided from an AC Power Source 20 into Rectified Voltage 22, while Boost Converter 16 operates as a power factor corrector to convert Rectified Voltage 22 into DC Output Voltage 24 to a Load 26, such as a computer system or sub-system of a computer system.

As illustrated in FIG. 1, the AC Voltage 18 provided from Terminals 28A and 28B of AC Power Source 20 alternates in polarity so that AC Nodes 30A and 30B of AC Bridge Rectifier 12 are driven alternately positive and negative with respect to one another. When AC Node 30A is positive with respect to AC Node 30B, current flows from Terminal 28A and through AC Node 30A and Rectifier 32A to Input Terminal 34A of Boost Converter 16, while return current from Load 26 flows from Input Return Terminal 34B of Boost Converter and through Rectifier 32B and AC Node 30B to Terminal 28B of Power Source 20. When AC Node 30B is positive with respect to AC Node 30A, current flows from Terminal 28B and through AC Node 30B and Rectifier 32C to Input Terminal 34A of Boost Converter 16, while return current from Load 26 flows from Input Return Terminal 34B of Boost Converter and through Rectifier 32D and AC Node 30A to Terminal 28A of Power Source 20. As a result, Rectified Voltage 22 is a full wave rectified waveform of half the amplitude and double the frequency of AC Voltage 18.

Boost Converter 16 includes an Inductor 36 having a first end connected from Input Terminal 34A and the second end connected to the Input 38I of the conductive path through a Switching Device 38, such as a transistor or MOSFET device. The Output 38O of the conductive path through Switching Device 38 is connected to Input Return Terminal 34B and a Gate Drive Signal 40 is provided to a Control Input 38C of the Switching Device 38. The junction between the second end of Inductor 36 and Input 38I of Switching Device 38 is further connected through a Rectifier 42 to a first end of an Energy Storage Capacitor 44, which is Output Terminal 46A of Boost Converter 16, while the second end of Energy Storage Capacitor 44, which is Output Return Terminal 46B of Boost Converter 16, is connected to Input Return Terminal 34B. DC Output Voltage 24 appears across Output Return Terminals 46A and 46B and, as shown in FIG. 1, Load 26 is connected across Output Return Terminals 46A and 46B.

As is well known and understood by those of ordinary skill in the relevant arts, Boost Converter 16 generates DC Output Voltage 24 from Rectified Voltage 22 by the periodic switching operation of Switching Device 38. That is, Switching Device 38 is driven into the conductive state by Gate Control Signal 40 to provide a conductive path through Inductor 36 to Input Return Terminal 34B, whereupon a "pulse" of current flows from Input Terminal 34A and through Inductor 36 and Switching Device 38. When Switching Device 38 is then driven into the non-conductive state by Gate Control Signal 40, the "pulse" of current continues to flow through Inductor 36 for a period of time determined by the parameters and values of the circuit components, such as Inductor 36 and Energy Storage Capacitor 44. As a result, the voltage at the junction between the second end of Inductor 36, Input 38I of Switching Device 38 and the input of Rectifier 40 increases and, because Switching Device 38 is now non-conducting, the current flows through Rectifier 42 and into Energy Storage Capacitor 44. Energy Storage Capacitor 44 stores the energy of the periodic "pulses" of current and filters or smooths the voltage waveform appearing at the junction between the second end of Inductor 36, Input 38I of Switching Device 38 and the input of Rectifier 40 to provide DC Output Voltage 24 to Load 26.

As is also well known and understood by those of ordinary skill in the relevant arts, DC Output Voltage 24 may be controlled and regulated by controlling the frequency or the pulse width or both of the pulses of current generated by the switching of Switching Device 38. In the implementation illustrated in FIG. 1, for example, the switching operation of Switching Device 38 is varied so that the "pulses" of current through Inductor 36 force the average current in Inductor 36 to closely track the shape of AC Voltage 18. As such, this action of modifying the input current in this manner is called "power factor correction", and provides a useful purpose for the implementation of Conventional Circuit 10.

A study of the circuit paths of a Conventional Switching Power Conversion Circuit (Conventional Circuit) 10 comprised of an AC Bridge Rectifier 12 and a Boost Converter 16 will show, however, that the circuit paths through which power is delivered to a Load 26 include a significant number of semiconductor devices, such as Rectifiers 32, because the rectification and voltage boost functions are performed separately, that is, by AC Bridge Rectifier 12 and Boost Converter 16. Each semiconductor device through which the power must flow to be provided to a Load 26, however, results in a power loss and in heat which must be dissipated or otherwise disposed of.

Figure 2:
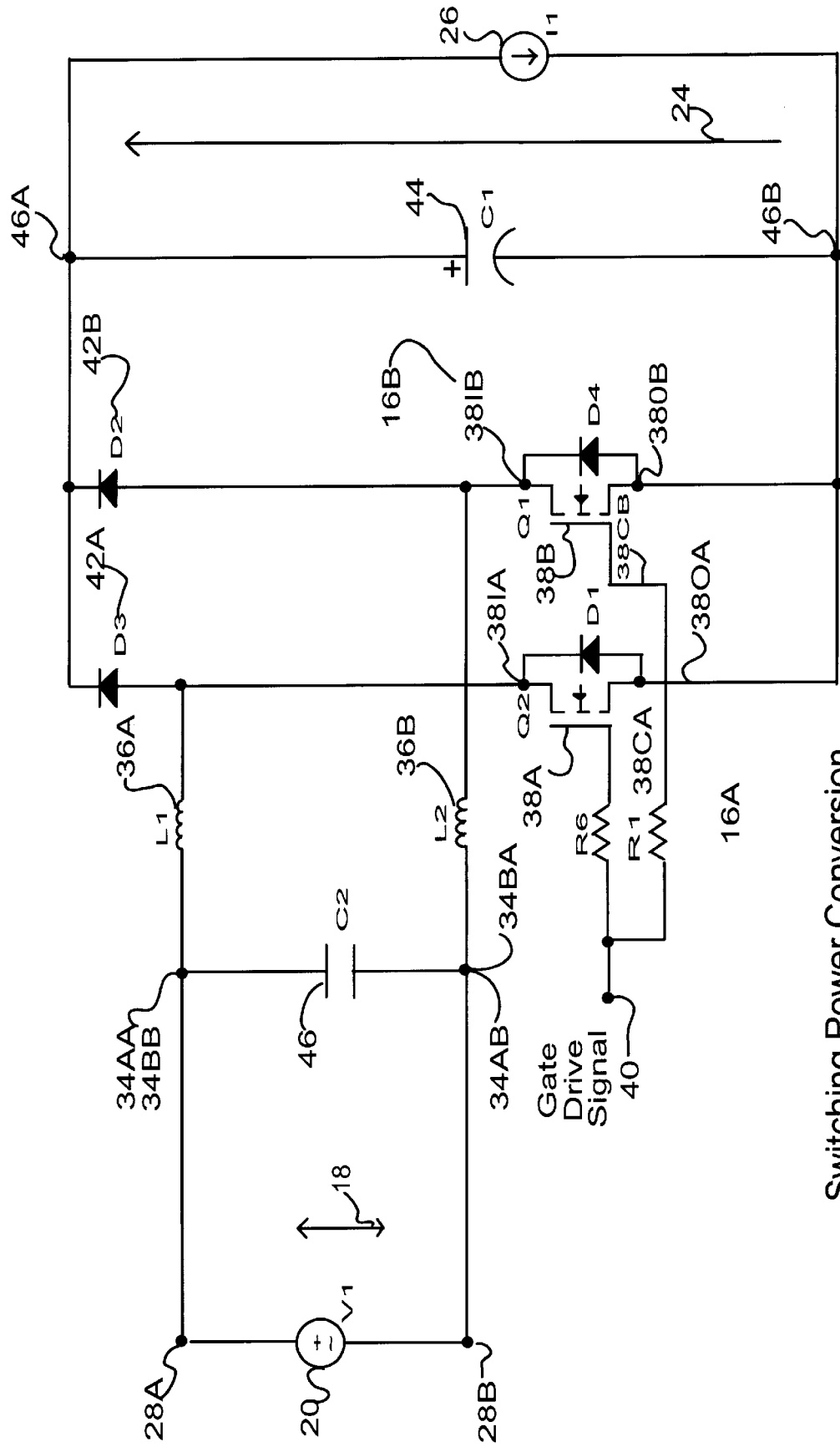
FIG. 2 is a block diagram of a switching power conversion circuit of the present invention.

Referring now to FIG. 2, therein is illustrated a Switching Power Conversion Circuit 100 of the present invention wherein, as described below, the number of semiconductor devices in the circuit paths through which power is delivered to a Load 26 is reduced, thereby reducing the power losses and heat dissipation in the power conversion circuit. It will be noted in referring to FIG. 2 that the Switching Power Conversion Circuit 100 of the present invention includes certain circuit elements and arrangements of circuit elements similar to those of a Conventional Circuit 10 as illustrated in FIG. 1 and that, for this reason, the reference numerals assigned to circuit elements and circuit nodes in FIG. 1 are repeated in FIG. 2 for purposes of facilitating a comparison of the two circuits and illustrating the fundamental differences between the power conversion circuits of the prior art and a power conversion circuit of the present invention. It will also be noted that certain elements of a Switching Power Conversion Circuit 100 that are well known and understood from the prior art are not shown therein in detail, such as a power factor control circuit or other form of power regulation sensing and feedback control circuitry, in order to focus on the present invention. The implementation of such elements in a Switching Power Conversion Circuit 100 of the present invention will be well understood by those of ordinary skill in the relevant arts, however, and thereby need not be discussed in further detail herein.

As shown in FIG. 2, a Switching Power Conversion Circuit 100 of the present invention does not include an AC Bridge Rectifier 12, but instead includes dual Boost Converters 16, respectively designated as Boost Converters 16A and 16B and each of which is generally similar in design and operation to a Boost Converter 16. As illustrated in FIG. 2, the inputs of Boost Converters 16A and 16B are connected to Terminals 28 of AC Power Source 20 in an inverted, complementary topology with respect to each other. That is, the Input Terminal 34AA of Boost Circuit 16A is connected from Terminal 28A of AC Power Source 20, while the Input Return Terminal 34BA of Boost Circuit 16A is connected to Terminal 28B of AC Power Source 20. In an inverse manner, the Input Terminal 34AB of Boost Circuit 16B is connected to Terminal 28B of AC Power Source 20, while the Return Terminal 34BB is connected to Terminal 28A of AC Power Source 20. Again, a Capacitor 46 is connected across Input Terminals 34AA and 34AB and Input Return Terminals 34BA and 34BB of Boost Converters 16A and 16B to operate as a noise suppression filter. The outputs of each of Boost Converters 16A and 16B are connected in parallel to Output Terminals 46A and 46B to provide DC Output Voltage 24 to Load 26.

As will be described in the following discussions of the invention, each of Boost Converters 16A and 16B operates during one half of the cycle of the alternating waveform of AC Voltage 18 from an AC Power Source 20 to deliver "pulses" of current through the Inductors 36, creating a boosted voltage to Energy Storage Capacitor 44. That is, Boost Converter 16A operates during the half cycle of AC Voltage 18 wherein Terminal 28A is positive with respect to Terminal 28B to provide "pulses" of current through Inductors 36 to Energy Storage Capacitor 44 while Boost Converter 16B operates during the alternate half cycle of AC Voltage 18, wherein Terminal 28B is positive with respect to Terminal 28A, to provide "pulses" of current through the Inductors 36 to Energy Storage Capacitor 44. Boost Converters 16A and 16B thereby, and according to the present invention, perform the functions of both an AC Bridge Rectifier 12 and a Boost Converter 16 of a Conventional Circuit 10. The circuit of a Switching Power Conversion Circuit 100 thereby reduces the number of semiconductor elements in the circuit paths through which power is provided to a Load 26, and thereby reduces the power losses in a Switching Power Conversion Circuit 100 in comparison to a Conventional Circuit 10.

As illustrated in FIG. 2, each of Boost Converters 16A and 16B is comprised of a Inductor 36, respectively designated as Inductors 36A and 36B, having a first end connected from the respective Input Terminals 34AA and 34AB of the Boost Converters 16A and 16B and the second end connected to the Inputs 38I, respectively designated as Inputs 38IA and 38IB, of the conductive paths through Switching Devices 38 of the Boost Converters 16A and 16B, which are respectively designated as Switching Devices 38A and 38B. Again, Switching Devices 38A and 38B may be, for example, transistors or MOSFET devices. The Outputs 38O of the conductive paths through Switching Devices 38A and 38B, respectively designated as Outputs 38OA and 38OB, are connected to Output Return Terminal 46B, and a Gate Drive Signal 40 is provided to Control Inputs 38CA and 38CB of Switching Device 38A and 38B. The junction between the second ends of Inductors 36A and 36B and Inputs 38IA and 38IB of Switching Devices 38A and 38B are respectively connected through Rectifiers 42A and 42B to a first end of an Energy Storage Capacitor 42, which is Output Terminal 46A of Boost Converters 16A and 16B, while the second end of Energy Storage Capacitor 42, which is Output Return Terminal 46B of Boost Converters 16A and 16B, is connected to Input Return Terminals 34BA and 34BB through paths described in further detail below. DC Output Voltage 24 thereby appears across Output Terminals 46A and 46B and Load 26 is connected across Output Terminals 46A and 46B.

Next considering the current return paths from a Load 26 and the regulation of the "pulses" of current provided by Boost Converters 16A and 16B, it was described above that each of Boost Converters 16A and 16B operates during one half of the cycle of the alternating waveform of AC Voltage 18 from an AC Power Source 20 to deliver a regulated "pulse" of current at a boosted voltage to Energy Storage Capacitor 44. As such, the current "pulses" delivered by Boost Converters 16A and 16B are regulated separately, and during the corresponding half cycles of the AC Voltage 18 waveform.

As illustrated in FIG. 2, the current return path from Output Return Terminal 46B to Input Return Terminal 34AB for Boost Converter 16A is comprised of a path Rectifier 52A and Inductor 36B. The current return path from Output Return Terminal 46B to Input Return Terminal 34BB for Boost Converter 16B, in turn, is comprised of a path through Rectifier 52B and Inductor 36A. It will be recognized that the two current return paths are alternately active as the current return path of the Switching Power Conversion Circuit 100 during alternating half cycles of the AC Voltage 18 waveform. That is, the current return path for Boost Converter 16A is the active return path within Boost Converter 16B during each half cycle of the AC Voltage 18 waveform wherein Terminal 28A is positive with respect to Terminal 28B, while the current return path for Boost Converter 16B is the active return path within Boost Converter 16A during each half cycle of the AC Voltage 18 waveform wherein Terminal 28B is positive with respect to Terminal 28A.

The nature of the voltage polarities and resulting return current through the return current paths of Boost Converters 16A and 16B is such that it is generally forced to flow in a continuous manner throughout each half of the ac cycle for which it is active. For instance, the current through Rectifier 52A will conduct nearly continuously for the entire period that Boost Converter 16A operates while Terminal 28A is positive with respect to Terminal 28B. Conversely the current through Rectifier 52B will conduct nearly continuously for the entire period that Boost Converter 16B operates while Terminal 28B is positive with respect to Terminal 28A. Hence, while a Boost Converter stage operates in a reverse current state, the "on" or "off" state of its Switching Device does not change the operation of the circuit. This characteristic allows a common connection of the Gate Drive Signal 40 between each of the Boost Converter stages. Additional efficiency is gained as a result, since the "on" period of the Switching Device 38 during the return current portion of its operation will reduce the forward conduction loss generally encountered in Rectifier 52.

With respect to the current return paths of Boost Converters 16A and 16B, it should be noted that Rectifier 52A is shown as being connected from Output 380B to Input 38IB of Switching Device 38B while Rectifier 52B is shown as being connected from Output 380A to Input 38IA of Switching Device 38A. It will be recognized by those of ordinary skill in the relevant arts, however, that Rectifiers 52A and 52B need not be connected across Switching Devices 38A and 38B for purposes of the current return paths of Boost Converters 16A and 16B. Rectifiers 52A and 52B are represented as connected across Switching Devices 38A and 38B in FIG. 2, however, to illustrate that Rectifiers 52A and 52B may be comprised of the intrinsic internal diodes of MOSFET devices, when Switching Devices 38A and 38B are comprised of MOSFET devices. Otherwise these rectifiers are included in the circuit for switching devices that do not have intrinsic internal diodes, such as switching bipolar transistors.

Finally, it will be noted that a Switching Power Conversion Circuit 100 of the present invention will further include power regulation sensing and feedback control circuitry to generate Gate Drive Signal 40. It will be understood by those of ordinary skill in the relevant arts that these elements of a Switching Power Conversion Circuit 100 may be analogous to the current sensing resistors and power factor control circuit illustrated in FIG. 1, or may assume many alternate forms. For example, there are implementations of power factor control circuits that operate on the principle of a fixed duty cycle over an entire line cycle and discontinuous current operation and that sense output voltage rather than current.

Lastly, from a standpoint of control, the resulting circuit characteristics derived from the new invention are nearly identical to those in the Conventional Circuit 10. That is, for a given set of component parameters for AC Voltage 18, Inductor 36, of which Inductors 36A and 36B sum up to the equivalent magnitude of said Inductor 36, Energy Storage Capacitor 44, and Load 26, a specific duty cycle control law applied to the Gate Drive Signal 40 of either circuit will generate a nearly equivalent magnitude of DC Output Voltage 24 within each circuit. Hence, it is possible to implement any of the useful applications of the Conventional Circuit 10 by using the Switching Power Conversion Circuit 100 with its inherent improvement in efficiency over the prior art. It will therefore be apparent to those of ordinary skill in the relevant arts that while the invention has been particularly shown and described herein with reference to preferred embodiments of the apparatus and methods thereof, various changes, variations and modifications in form, details and implementation may be made therein without departing from the spirit and scope of the invention as defined by the appended claims, certain of which have been described herein above. It is therefore the object of the appended claims to cover all such variation and modifications of the invention as come within the true spirit and scope of the invention.

What is claimed is:

1. A switching power conversion circuit, comprising:
    first and second switching boost converter circuits having
        alternating current inputs connected inversely with respect to each other to an alternating current power source and
        current outputs connected in parallel across an energy storage capacitor providing direct current power to the load, and
        a switching control input connected to a gate switching signal controlling operation of the first and second switching boost converter circuits.

2. The switching power conversion circuit of claim 1, wherein:
    the input terminal of the first boost converter circuit and the input return terminal of the second boost converter circuit are connected together for connection to a first terminal of the alternating current power source,
    the input terminal of the second boost converter circuit and the input return terminal of the first boost converter circuit are connected together for connection to a second terminal of the alternating current power source, and
    output terminals of the first and second boost converter circuits are connected to a first end of the energy storage capacitor and output return terminals of the first and second boost converter circuits are connected to a second end of the energy storage capacitor.

3. The switching power conversion circuit of claim 1, wherein each boost converter circuit comprises:
    a switching device having an input and an output connected to a conductive path through the switching path and a switching control input, and
    an inductor having a first end connected from the input terminal of the boost converter circuit and a second end connected to the input of the switching device conductive path, wherein
        the input of the switching device conductive path is connected to a first end of the energy storage capacitor, and
        the output of the switching device conductive path is connected to a second end of the energy storage capacitor and to the input return terminal of the boost converter circuit, and
        the switching control input of the switching device is connected to the gate switching signal.

4. The switching power conversion circuit of claim 3, wherein:
    the current return path of the first boost converter includes
        a diode connected between the output and input of the second switching device conductive path, and
        the inductor connected between the input of the second switching device conductive path and the input terminal of the second boost converter circuit, and
    the current return path of the second boost converter includes
        a diode connected between the output and input of the first switching device conductive path, and
        the inductor connected between the input of the first switching device conductive path and the input terminal of the first boost converter circuit.

5. A method for providing direct current power to a load from an alternating current power source, comprising the steps of:
    providing current to an energy storage capacitor connected across the load from each of a first switching boost converter circuit and a second switching boost converter circuit, and
    controlling the first and second switching boost converter circuits to operate alternately during corresponding half cycles of the alternating current power source, wherein the first and second switching boost converter circuits each have
        alternating current inputs connected inversely with respect to each other to the alternating current power source and
        current outputs connected in parallel across the energy storage capacitor for storing current and providing direct current power to the load, and
        a switching control input connected to a gate switching signal controlling operation of the first and second switching boost converter circuits.

* * * * *